(12) United States Patent
Schäferling

(10) Patent No.: US 8,496,102 B2
(45) Date of Patent: Jul. 30, 2013

(54) COLLECTING CONVEYOR

(75) Inventor: Rudolf Schäferling, Bissingen (DE)

(73) Assignee: Grenzebach Maschinenbau GmbH, Asbach-Baumenheim (DE)

( * ) Notice: Subject to any disclaimer, the term of this patent is extended or adjusted under 35 U.S.C. 154(b) by 281 days.

(21) Appl. No.: 12/667,708

(22) PCT Filed: Jun. 16, 2008

(86) PCT No.: PCT/DE2008/001025
§ 371 (c)(1), (2), (4) Date: Jan. 5, 2010

(87) PCT Pub. No.: WO2009/006866
PCT Pub. Date: Jan. 15, 2009

(65) Prior Publication Data
US 2010/0187069 A1    Jul. 29, 2010

(30) Foreign Application Priority Data
Jul. 9, 2007   (DE) .......................... 10 2007 031 907

(51) Int. Cl.
B65G 47/26       (2006.01)
(52) U.S. Cl.
USPC ................ 198/418.7; 198/430; 198/463.3; 198/468.6; 198/607; 198/631.1
(58) Field of Classification Search
USPC ............. 198/418.7, 463.3, 468.6, 607, 631.1
See application file for complete search history.

(56) References Cited

U.S. PATENT DOCUMENTS

| | | | | |
|---|---|---|---|---|
| 1,718,870 A | * | 6/1929 | Noell .......................... | 198/463.3 |
| 1,976,855 A | * | 10/1934 | McKee et al. .............. | 198/419.2 |
| 2,073,097 A | * | 3/1937 | Dziedzic et al. ........... | 198/419.2 |
| 3,403,772 A | | 10/1968 | Vadas | |
| 3,565,241 A | * | 2/1971 | Race et al. ................. | 198/419.2 |
| 3,737,021 A | * | 6/1973 | Reth et al. .................. | 198/419.3 |
| 4,059,193 A | | 11/1977 | Ryumon et al. | |
| 4,658,947 A | * | 4/1987 | Welder ....................... | 198/346.2 |

(Continued)

FOREIGN PATENT DOCUMENTS

| | | |
|---|---|---|
| DE | 1781436 | 4/1973 |
| DE | 2713895 | 10/1977 |

(Continued)

OTHER PUBLICATIONS

Japanese Patent Office, "Notification of Reasons for Refusal", mailed May 15, 2012, pp. 1-9.

*Primary Examiner* — Joseph A Dillon, Jr.
(74) *Attorney, Agent, or Firm* — Duane Morris, LLP; J. Rodman Steele, Jr.; Gregory M. Lefkowitz

(57) ABSTRACT

A method and device for collecting bodies, which are delivered in an irregular sequence, on a collecting belt, with the following features: a) the bodies which are delivered are moved more rapidly than predetermined by the running speed of the collecting belt (7), b) a pimpled belt (8) having ridges (12) is located in the end region of the collecting belt (7) and can be raised over the upper edge of the collecting belt (7) by means of a lifting device (5), c) the pimpled belt (8) is raised and accelerated as a function of being completely covered with bodies, and also a control program for carrying out the method.

8 Claims, 3 Drawing Sheets

U.S. PATENT DOCUMENTS

| | | | |
|---|---|---|---|
| 4,759,433 A * | 7/1988 | Kraft | 198/418.7 |
| 4,815,919 A * | 3/1989 | Juravic | 414/416.04 |
| 4,938,336 A * | 7/1990 | Aquino et al. | 198/369.2 |
| 4,960,198 A * | 10/1990 | Hogenkamp | 198/419.2 |
| 5,004,094 A | 4/1991 | Brandt | |
| 5,419,425 A | 5/1995 | Goater | |
| 7,654,381 B2 * | 2/2010 | Webb | 198/431 |
| 7,784,606 B2 * | 8/2010 | Bonora et al. | 198/817 |

FOREIGN PATENT DOCUMENTS

| | | |
|---|---|---|
| DE | 19715949 | 10/1998 |
| DE | 10230653 | 7/2002 |
| JP | 2002114364 A | 4/2002 |

* cited by examiner

COLLECTING CONVEYOR

CROSS-REFERENCE TO RELATED APPLICATIONS

This application is a §371 national stage entry of International Application No. PCT/DE2008/001025, filed Jun. 16, 2008, which claims priority to German Patent Application No. 10 2007 031 907.1, filed Jul. 9, 2007, both of which are hereby incorporated by reference.

FIELD OF THE INVENTION

The present invention relates to an apparatus and a process for collecting successive piece goods.

BACKGROUND

DE 26 10 475 A1 discloses a conveyor for plate-like articles which is based on the object of providing a conveyor allowing automatic carrying-out of a procedure that is normally performed by an operator when he takes plate-like articles from stacks individually by hand and supplies them to a cutting apparatus as a function of the timing of other work procedures.

This object is achieved by a conveyor for plate-like articles that is characterized in that it has at its leading end a suction box which has a suction opening, is supported on plates arranged substantially perpendicularly, laterally next to one another so as to be able to move back and forth in relation to a block and has a drive which travels back and forth in conjunction with the suction box and moves the suction opening in the direction of the stack of plates and back again. Furthermore, this known conveyor has a cover of the suction box that is engaged in a sliding manner with a stationary cover which has an inlet in conjunction with an air tube and a reduced-pressure source and an air opening in the cover which is connected to the suction box and is connected at all times to the inlet of the stationary cover (claim 1).

Shingles or other plates which are delivered in a block are individually removed and supplied for further processing by way of this known conveyor. This known conveyor is not suitable for the conveyance of individually delivered plates and conveyance without the use of a suction box.

DE 17 81 436 A1 discloses a means operating with suction air for conveying goods with a flat or almost flat surface that is equipped with an endless, air-permeable band guided around two deflection rolls and with a suction box which is arranged between the two deflection rolls, connected to a suction pump and rests with its open underside against the upper side or inside of the lower strand of the band.

The inventive aspect of this conveying apparatus is said to be the fact that the conveyor band consists of a flexible, endless band which is provided with openings and to which a layer made of open-cell foam is fastened, the open cells of the layer being connected to the openings (claim 1).

This known apparatus is intended to achieve the object of securely holding even goods with uneven surfaces on conveyor bands with suction means.

This apparatus is not suitable for conveyors which do not adhere to the principle of the suction method.

Furthermore, DE 102 30 653 B4 discloses a collecting conveyor which makes provision, for a cutting machine for cutting loaf-shaped products with a movable collecting band to which reduced pressure is applied at least in certain regions, for the collecting band to have a plurality of transport belts running set apart from one another in parallel and/or suction nozzles, to which reduced pressure is applied, to be arranged between the transport belts.

This collecting conveyor is intended to achieve the object of embodying a corresponding collecting conveyor in such a way that it is easy to clean while at the same time allowing precise deposition of the slices.

This prior art also relates to a conveyor which operates using reduced pressure.

A means for transferring piece goods, which are continuously conveyed on a conveyor band, to a base is known from DE 27 13 895 A1. This means is based on the object of providing a high-performance transporting and transferring means which operates in a fully automatic manner and is capable of grouping in a predetermined number moldings supplied on a continuously operating conveyor band and depositing them onto a pallet or a number of laths corresponding to the size of the moldings.

This object is achieved substantially in that a plurality of discontinuously operating liftable and lowerable conveyor bands consist of a plurality of parallel bands, some of which are provided with humps which, in the raised position, reach through the intermediate spaces between the bands of another conveyor band, protrude slightly beyond the level thereof and take over the piece goods from the other conveyor band.

The moldings are brick moldings. Although DE 27 13 895 A1 discloses conveyor bands which can be raised so as to reach through the intermediate spaces of other conveyor bands, brick moldings must be handled as piece goods, simply by virtue of their weight and compact dimensions, differently to relatively light mineral mats having a large surface area. DE 27 13 895 A1 makes no reference to one-sided raising of a conveyor band and accelerated conveying or a particular configuration of partly attached dimple ridges.

DE 197 15 949 A1 discloses a process for separating small-sized articles and a separating apparatus in which substantially the gapless stringing-together of articles between a build-up band conveyor and a feed band conveyor is achieved via a different band-running speed, pairs of special gripper arms being used for the purposes of separating.

However, in this case, the underlying object is a separation of articles delivered on a conveyor band and not a collection and subsequent onward conveyance.

SUMMARY OF THE INVENTION

It is therefore the object of the present invention to specify an apparatus and a process for rapidly and reliably collecting plate-like bodies.

This object is achieved by an apparatus as claimed in claim 1 and a process as claimed in claim 2 respectively.

This object is achieved by an apparatus and a process as described herein.

BRIEF DESCRIPTION OF THE DRAWINGS

The collecting apparatus according to the invention will be described hereinafter in greater detail. In the individual drawings.

DETAILED DESCRIPTION

Figure 1:
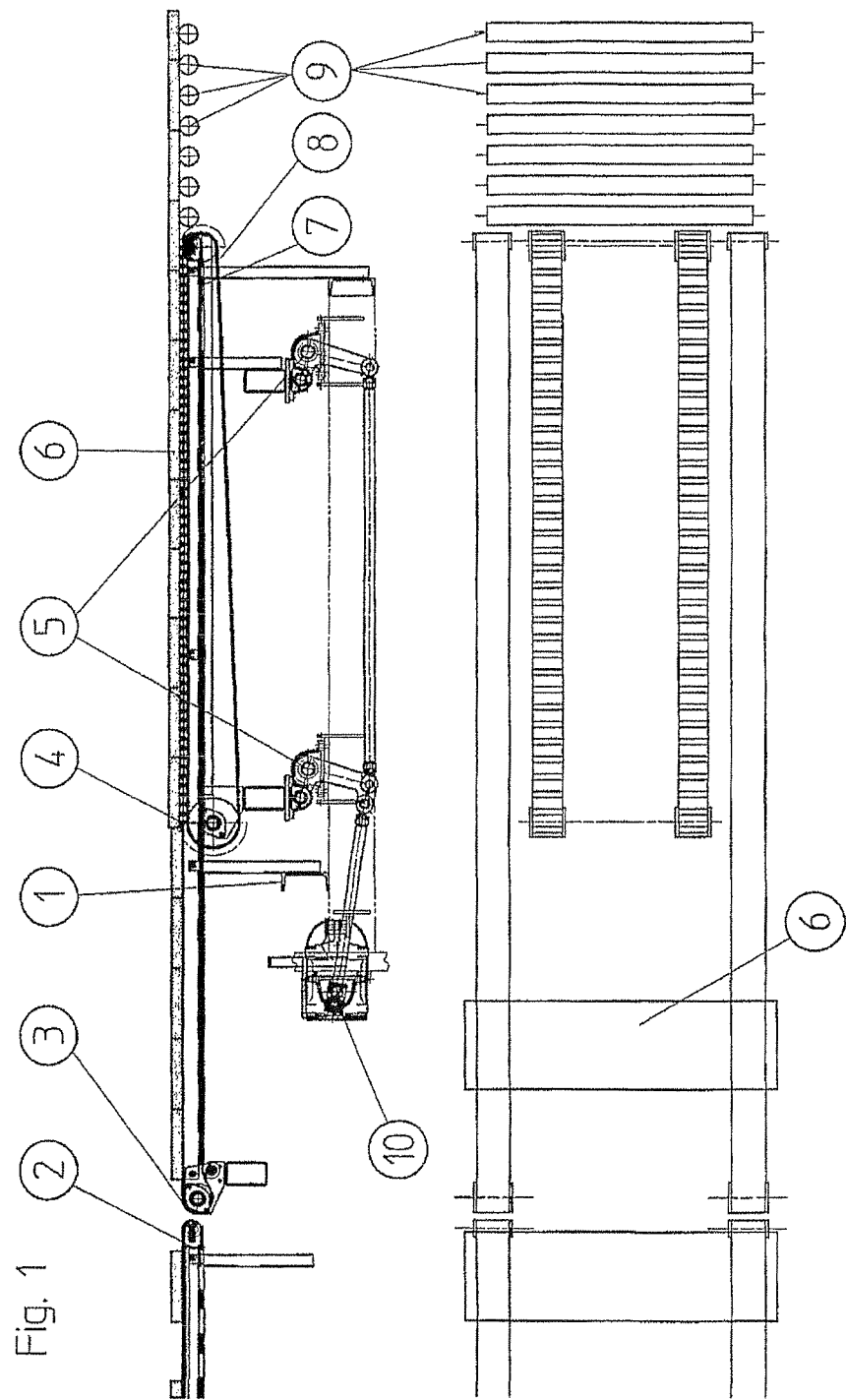
FIG. 1 is a section and a plan view onto the apparatus according to the invention.

In FIG. 1 mineral wool mats (6) or a similar material, for example, are delivered in an irregular order by the supply band (2) shown on the left-hand side. The apparatus according to the invention collects the separated, sheet-like bodies in a manner such that they abut one another and are then jointly greatly accelerated in order to be further processed in a further processing stage.

The apparatus according to the invention consists in this case of a basic frame (1) in which the collecting band (7) is mounted and into which, on its left-hand side, the drive (3) for the collecting band is integrated.

As may be seen from the plan view of FIG. 1, the collecting band (7) consists of two parallel-running bands, two tracks of a dimpled acceleration band (8), which are in turn driven by a separate drive (4), running in the intermediate space left free by these bands (7) on a specific length.

The two lanes of the dimpled acceleration band (8) run just below the plane defined by the upper edge of the collecting band (7) and can jointly be raised via the lifting apparatus (5).

This is brought about via the crank drive (10). The onward conveyance of the respective material to be conveyed, for example the mineral wool mats (6), is carried out via the rolls (9).

Figure 2:
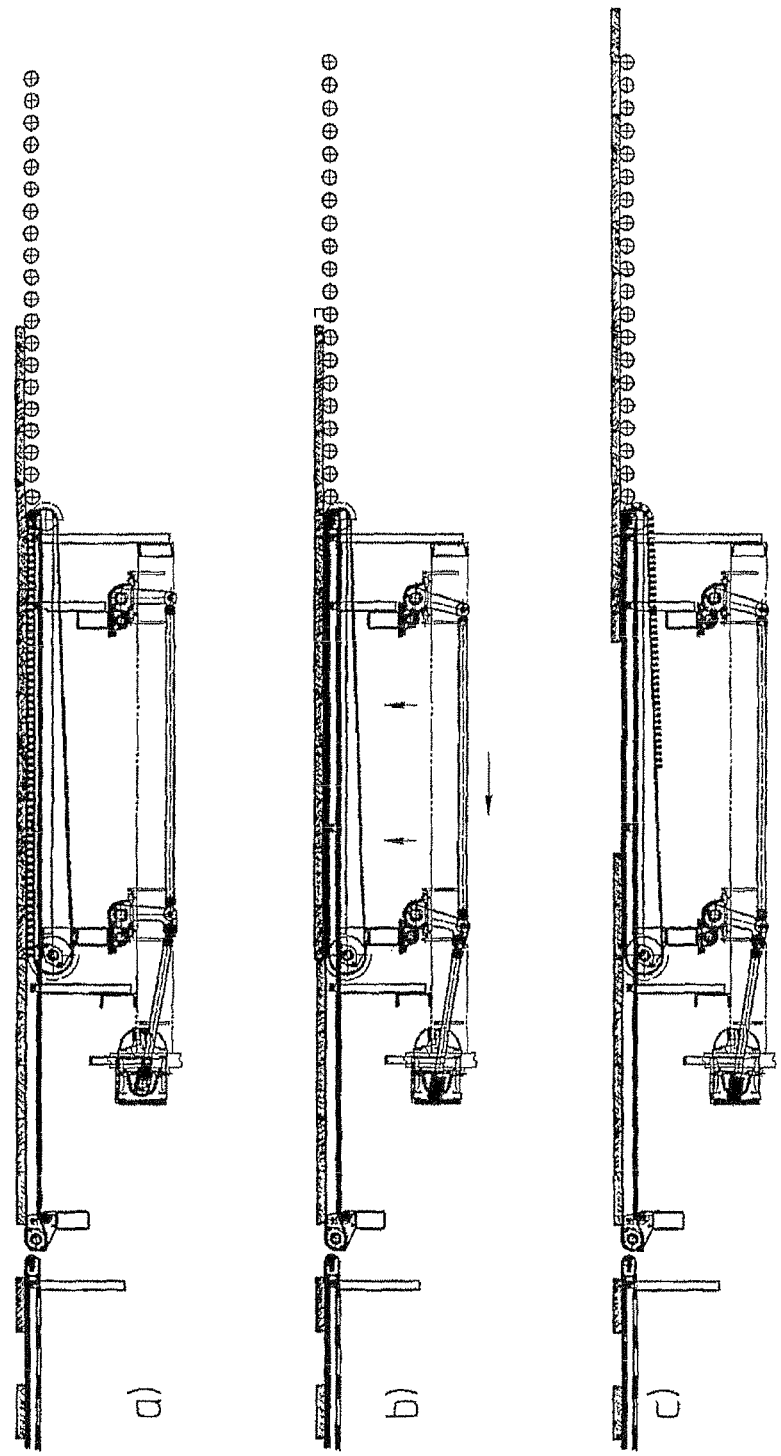
FIG. 2 shows 3 different working positions of the apparatus.

The mode of operation of the apparatus according to the invention is illustrated in the different working positions to be seen in FIGS. 2a to 2c.

The collecting band (7) runs in this case more slowly than the supply band (2), so that the gaps which are present on the supply band (2), as the mats (6) mounted there are applied in an irregular order, close up on the collecting band (7) as a result of the fact that the mats (6) advanced on the more rapid supply band (2) build up in the front region of the collecting band (7). This places the mats (6), as desired, close together in the entire region of the collecting band (7). In a partial region at the end of the collecting band (7), the dimpled acceleration band (8), or the dimpled band for short, is left at this moment untouched in a lower position than the surface of the collecting band (7).

Once the collecting band (7) is covered completely, up to its end, by mats (6), the dimpled band (8) becomes operative. The dimpled band is raised by the crank drive (10) and at the same time greatly accelerated. This enables the mats grasped by the dimpled band (8) to be supplied, overall as a composite of a number of mats (6) determined by the cycle time, in quick succession via the conveying rolls (9) to further processing. This procedure is basically sketched in FIG. 2b.

FIG. 2c shows how the dimpled band (8) moves onward and the region fitted with dimple ridges (12) appears at the underside of this revolving endless band.

Figure 3:
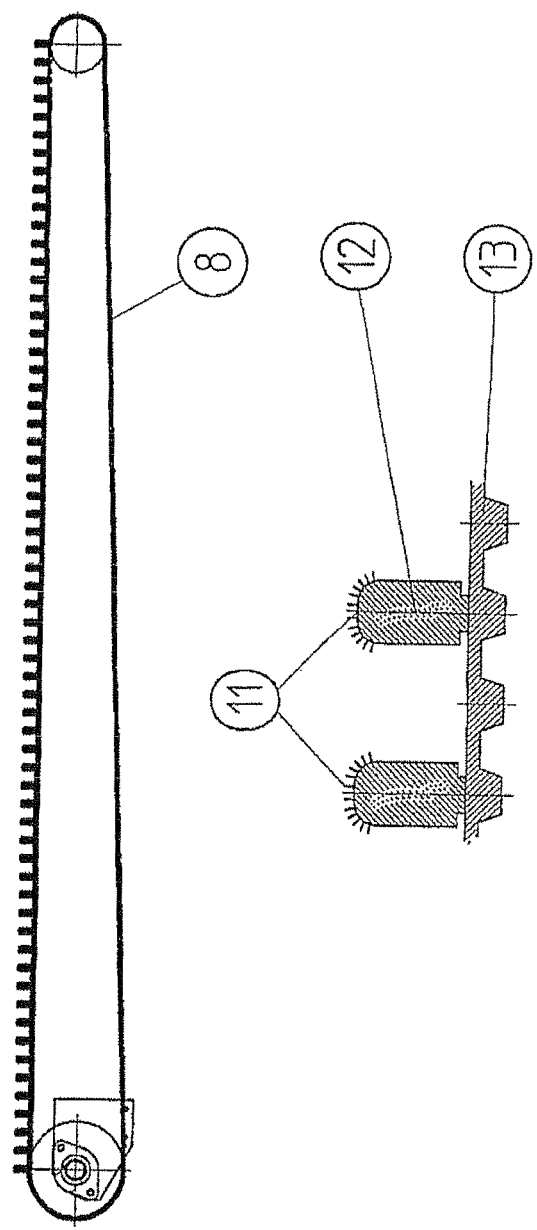
FIG. 3 shows details of the dimpled acceleration band.

FIG. 3 shows in isolation the details of the dimpled acceleration band (8). The carrier band, in the form of the toothed belt (13), forms the basis of this band. Dimple ridges (12) with a corresponding grip lagging (11) are attached to the toothed belt (13) in a specific region. The cropping-up of the dimpled band (8) in the region of the collecting band (7) and the simultaneous appearance of the dimple ridges (12) ensures that the mats (6) can be grasped and accelerated securely and in a slip-free manner. Either the grip lagging (11) is exchangeable, in accordance with the material of the mats to be collected, or, if required, all of the dimple ridges (12) are exchangeably fastened to the toothed belt (13).

Servo motors are used as the drives.

All of the motion sequences are detected by corresponding sensors, the output signals of which are processed in a control program controlling the sequence as a whole.

Sensors are additionally provided for detecting procedures that indicate in advance that non-operating states are looming and the output signals of which are utilized to prevent collisions in the control program.

LIST OF REFERENCE NUMERALS (1) basic frame, collecting band
(2) supply band
(3) drive for collecting band
(4) drive for the dimpled acceleration band
(5) lifting apparatus
(6) mineral wool mats
(7) collecting band
(8) dimpled acceleration band, dimpled band
(9) conveying rolls
(10) crank drive
(11) grip lagging
(12) dimple ridge
(13) toothed belt

The invention claimed is:

1. A collecting conveyor for collecting plate-like bodies delivered in an irregular order, comprising:
   a) a conveyor band for the conveyance of rectangular plate-like bodies (6) is configured as a two-track supply band (2), wherein the tracks of the supply bands are separated from and parallel to one another,
   b) a two-track collecting and (7) follows the supply hand (2) in a direction of travel of the supply band (2),
   c) a dimpled band (8) located at an end region of the collecting band, wherein said dimpled band (8) is coupled to a lifting apparatus (5) for moving the dimpled band (8) between a resting position where the entire dimpled band (8) is below an upper edge of the collecting; and (7) and an active position where the dimpled band (8) is raised above the upper edge of the collecting band (7), and wherein said dimpled band (8) is coupled to a drive (4) for moving the dimpled band (8) in the direction of travel,
      wherein the dimpled band (8) comprises two parallel-running toothed belts (13) which each comprise longitudinally spaced-apart, dimpled ridges (12), fastened thereto,
      wherein the dimple ridges (12) are exchangeably fastened to a toothed belt (13) or the dimple ridges are provided with an exchangeable grip lagging (11), and
   d) sensors for individually detecting and monitoring the plate-like bodies (6) as they are transported sequentially by the supply band (2), the collecting band (7) and the dimpled band (8).

2. A process for collecting plate-like bodies delivered in an irregular order, comprising:
   a) providing a collecting conveyor according to claim 1;
   b) the rectangular plate-like bodies (6) are advanced for collection via the two-track supply band (2) in the width of the longitudinal side of the plate-like bodies (6),
   c) the plate-like bodies (6) arrive at the subsequent two-track collecting band (7), located in the end region of the collecting band, countersunk at the center, is the dimpled hand,
   d) when a tight packed layer of plate-like bodies (6) has been produced at the end of the collecting band (7), viewed in the direction of travel, by natural build-up, the dimpled band (8) is raised above the collecting band (7) by means of the lifting apparatus (5) and the dimpled band, which includes the specially formed and exchangeable dimple ridges (12) located thereon in certain regions, is accelerated and conveys the plate-like bodies (6) located in this region onward at accelerated speed,
   e) for a trouNe-free sequence, the sensors individually detect and monitor the plate-like bodies (6) as they are transported sequentially by the supply band (2), the collecting band (7) and the dimpled band (8).

3. The collecting conveyor of claim 1, wherein servo motors are used as drives for all units.

4. The collecting conveyor of claim 1, wherein the collecting had runs more slowly than the supply bands.

5. The collecting conveyor of claim 1, wherein the collecting band and the dimpled band terminate along a common axis.

6. The collecting conveyor of claim 1, wherein, once accelerated, the dimpled hand runs faster than the collecting band.

7. The collecting conveyor of claim 1, further comprising:
   e) a plurality of rolls (9) for further conveyance in the direction of travel of the dimpled hands, wherein plate-like bodies (6) are transferred from the collecting bands (7) onto the plurality of rolls (9) when the dimpled band (8) is raised and accelerated.

8. The collective conveyor of claim 1, wherein the plate-like bodies are mineral wool mats.

* * * * *